US009690533B2

(12) United States Patent
Ohta et al.

(10) Patent No.: US 9,690,533 B2
(45) Date of Patent: Jun. 27, 2017

(54) DISPLAYING SYSTEM, DISPLAY CONTROLLER, STORAGE MEDIUM AND METHOD

(71) Applicant: NINTENDO CO., LTD., Kyoto (JP)

(72) Inventors: Keizo Ohta, Kyoto (JP); Toshiaki Suzuki, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 91 days.

(21) Appl. No.: 13/927,621

(22) Filed: Jun. 26, 2013

(65) Prior Publication Data

US 2014/0152544 A1 Jun. 5, 2014

(30) Foreign Application Priority Data

Dec. 4, 2012 (JP) ................................. 2012-265816

(51) Int. Cl.
*G06F 3/14* (2006.01)
*G06F 3/147* (2006.01)
*G09B 29/10* (2006.01)
*G09B 29/00* (2006.01)

(52) U.S. Cl.
CPC ............ *G06F 3/1423* (2013.01); *G06F 3/147* (2013.01); *G09B 29/007* (2013.01); *G09B 29/106* (2013.01)

(58) Field of Classification Search
None
See application file for complete search history.

(56) References Cited

U.S. PATENT DOCUMENTS

| 7,121,945 | B2 * | 10/2006 | Suganuma et al. ............. 463/34 |
| 2002/0165028 | A1 | 11/2002 | Miyamoto et al. |
| 2003/0107569 | A1 | 6/2003 | Endo et al. |
| 2005/0213946 | A1 * | 9/2005 | Braun ........................... 386/105 |
| 2006/0132602 | A1 | 6/2006 | Muto et al. |
| 2008/0291217 | A1 * | 11/2008 | Vincent et al. ............... 345/629 |
| 2009/0240431 | A1 * | 9/2009 | Chau et al. .................. 701/208 |
| 2009/0262145 | A1 | 10/2009 | Akita et al. |
| 2010/0123737 | A1 * | 5/2010 | Williamson et al. ......... 345/672 |
| 2011/0164137 | A1 * | 7/2011 | Schwartz et al. ............. 348/159 |
| 2011/0285704 | A1 * | 11/2011 | Takeda et al. ................ 345/419 |

(Continued)

FOREIGN PATENT DOCUMENTS

| EP | 2 518 607 | 10/2012 |
| JP | 2001-034247 | 2/2001 |

(Continued)

OTHER PUBLICATIONS

Office Action (3 pages) dated Jan. 28, 2014, issued in corresponding Japanese Application No. 2012-265816 and English translation (3 pages).

(Continued)

*Primary Examiner* — Alexander Eisen
*Assistant Examiner* — Kebede Teshome
(74) *Attorney, Agent, or Firm* — Nixon & Vanderhye P.C.

(57) ABSTRACT

An exemplary display system includes: a first display device; a second display device; and a display control unit that controls one of the first display device and the second display device to display a map image corresponding to a given position, and controls the other of the first display device and the second display device to display a partial image which is a part of a panoramic image corresponding to the position.

18 Claims, 9 Drawing Sheets

(56) References Cited

U.S. PATENT DOCUMENTS

| | | | |
|---|---|---|---|
| 2012/0050331 A1* | 3/2012 | Kanda | G06F 3/1454 345/649 |
| 2012/0140077 A1 | 6/2012 | Muto et al. | |
| 2012/0176500 A1 | 7/2012 | Muto et al. | |
| 2012/0262492 A1* | 10/2012 | Ohashi et al. | 345/660 |
| 2013/0083055 A1* | 4/2013 | Piemonte et al. | 345/629 |
| 2013/0090845 A1 | 4/2013 | Wakayanagi et al. | |
| 2014/0087877 A1* | 3/2014 | Krishnan | 463/33 |

FOREIGN PATENT DOCUMENTS

| | | |
|---|---|---|
| JP | 2002-325963 | 11/2002 |
| JP | 2004-070608 | 3/2004 |
| JP | 2005-006081 | 1/2005 |
| JP | 2005-284886 | 10/2005 |
| JP | 2007-127437 | 5/2007 |
| WO | 2012/046268 | 4/2012 |

OTHER PUBLICATIONS

"Introductory book of Google programming", First Ed., Rutles, Inc., Apr. 25, 2010, pp. 80-84 with concise English explanation of relevance, 9 pages.

"360 Panorama, iPhone 4S and iOS 5 Startup Guide", Japan, Mynavi Corporation, Oct. 29, 2011, p. 121 with concise English explanation of relevance (5 pages).

[Online]—"Using Street View", http://maps.google.com/intl/en/help/maps/streetview/learn/using-street-view.html, 1 page, printed Apr. 26, 2013.

Extended European Search Report (6 pgs.) dated Jul. 23, 2014 issued in corresponding European Application No. 13173558.1.

European Office Action issued in Application No. 13 173 558 dated Sep. 29, 2015.

* cited by examiner

DISPLAYING SYSTEM, DISPLAY CONTROLLER, STORAGE MEDIUM AND METHOD

CROSS REFERENCE TO RELATED APPLICATION

The disclosure of Japanese Patent Application No. 2012-265816, filed on Dec. 4, 2012, is incorporated herein by reference.

FIELD

The present disclosure relates to displaying a panoramic image corresponding to a position on a map.

BACKGROUND AND SUMMARY

Technologies for displaying a part of a picture (a panoramic image) captured at a point on a map, are known.

The present disclosure provides, using two display devices, simultaneously displaying different items of information relating to a position on a map.

There is provided a display system including: a first display device; a second display device; and a display control unit that controls one of the first display device and the second display device to display a map image corresponding to a given position, and controls the other of the first display device and the second display device to display a partial image which is a part of a panoramic image corresponding to the position.

BRIEF DESCRIPTION OF THE DRAWINGS

Exemplary embodiments will be described with reference to the following drawings, wherein.

DETAILED DESCRIPTION OF NON-LIMITING EXEMPLARY EMBODIMENT

1. Exemplary Embodiment

Figure 1:
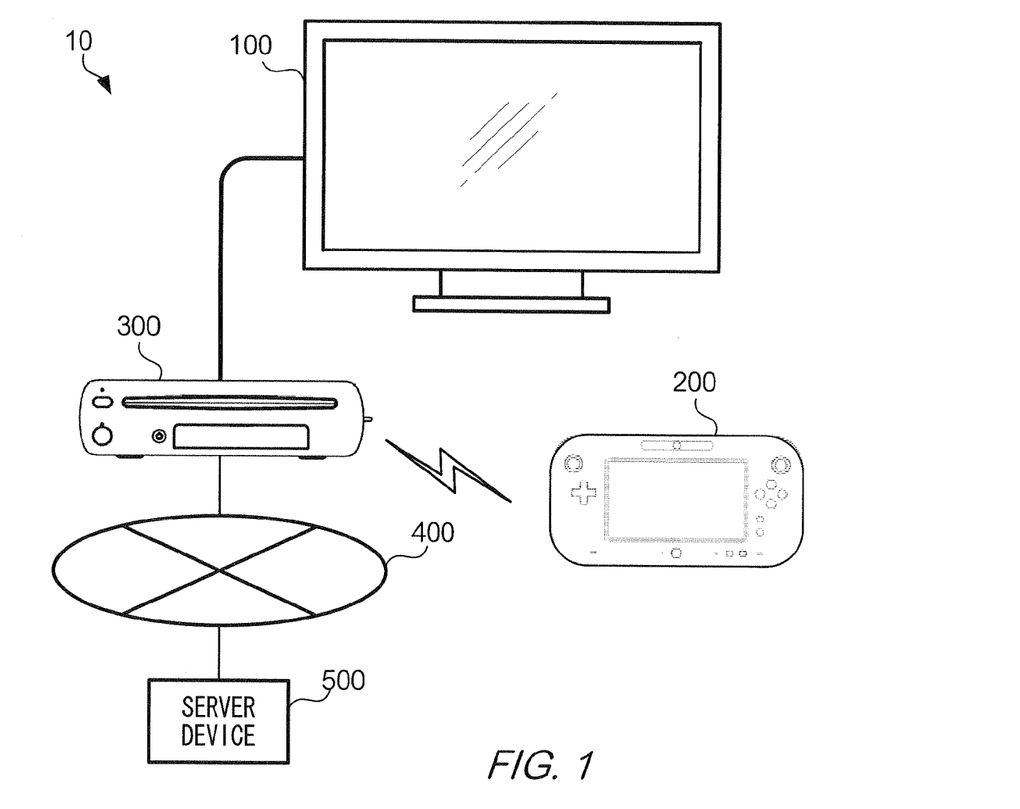
FIG. 1 shows an example of a configuration of display system 10.

FIG. 1 shows an example of a configuration of display system 10 according to one exemplary embodiment. Display system 10 provides a service for displaying information relating to a map. Hereinafter, the service is referred to as a "map displaying service." In this example, the map shows geographical information on the earth. Display system 10 includes display device 100, terminal device 200, information-processing device 300 (main unit), and server device 500. Information-processing device 300 and server device 500 are connected via network 400.

Display device 100 is a stationary display device, for example, a television. In this example, display device 100 has a larger display area than terminal device 200. It is to be noted that display device 100 is not restricted to a television, and may be a projector that projects an image onto a screen or a wall.

Terminal device 200 is an input device that receives an operation input by a user and also is an output device that displays an image. In this case, terminal device 200 is a portable display device. A user operates terminal device 200, for example, by pushing a button and/or tilting terminal device 200 with terminal device 200 being held in his/her hands. By the operation, an image displayed on terminal device 200 is changed. It is to be noted that a user may input an operation by touching a screen of terminal device 200, as well as by pushing a button.

Information-processing device 300 is a computer device that controls displaying an image on display device 100 and terminal device 200. Information-processing device 300 receives data for controlling display of data in response to an operation input by a user, and provides display data to display device 100 and terminal device 200. Here, "display data" is data for controlling each of display device 100 and terminal device 200 to display an image.

Server device 500 is a computer device that provides information relating to a map. Hereinafter, "map data" refers to information provided by server device 500. In this example, the map data is stored in a storing unit of server device 500. However, the map data may be stored in an external storage device and server device 500 may read the map data from the storage device. Plural devices may perform distributed processing for implementing functions of server device 500. In other words, display system 10 may include at least one server device 500.

The map data includes image data showing a map of a given position, and image data showing a panoramic image. The map image is an image showing a map. The panoramic image is an image showing a view from a given position and corresponds to views in various directions from the given position.

Figure 2:
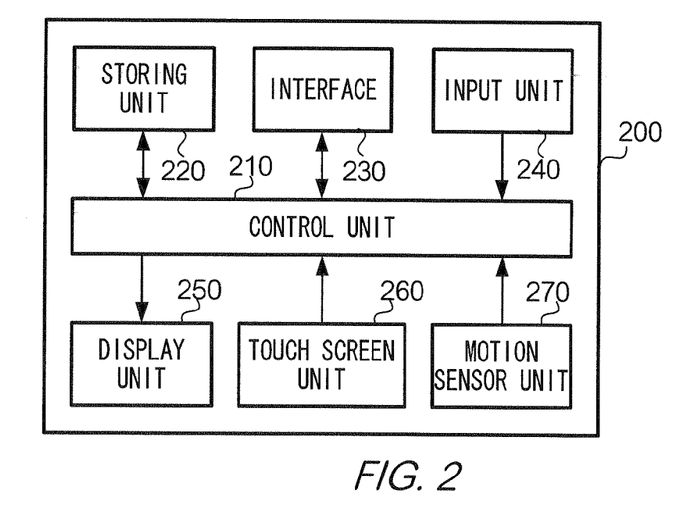
FIG. 2 shows an example of a hardware configuration of terminal device 200.

FIG. 2 shows an example of a hardware configuration of terminal device 200. Terminal device 200 includes control unit 210, storing unit 220, interface 230, input unit 240, display unit 250, touch screen unit 260, and motion sensor unit 270.

Control unit 210 controls hardware components of terminal device 200. Control unit 210 includes a processor such as a CPU (Central Processing Unit) and a memory, and executes various processes by causing the CPU to execute a program.

Storing unit 220 stores data. Storing unit 220 includes a storage device such as a flash memory, and stores data used for a process executed by control unit 210.

Interface 230 communicates data with information-processing device 300. Interface 230 includes an antenna and a modem, and communicates with information-processing device 300 in accordance with a predetermined communication protocol. For example, interface 230 communicates with information-processing device 300 via a wireless LAN (Local Area Network).

Input unit 240 receives an operation input by a user. Input unit 240 includes a button and/or a lever, and provides to control unit 210 data showing an operation input by a user.

Display unit 250 displays an image. Display unit 250 includes a display panel of a liquid crystal device or an organic EL (electroluminescence) device, as well as a driver circuit thereof, and displays data in accordance with display data.

Touch screen unit 260 receives an operation input via a screen by a user. Touch screen unit 260 includes a touch sensor mounted on a display panel, and provides coordinate data showing a position (coordinate) touched by a user. A user can identify a position on a screen using his/her finger or a stylus.

Motion sensor unit 270 detects motion of terminal device 200. Motion sensor unit 270 includes, for example, an acceleration sensor (a triaxial acceleration sensor) for measuring an acceleration of terminal device 200, a gyro sensor for measuring a change of angle or an angular velocity of terminal device 200, and an earth magnetism sensor for measuring an earth magnetism. Motion sensor unit 270 provides to control unit 210 sensor data showing the measured physical quantity. For example, if terminal device 200 is tilted, terminal device 200 outputs sensor data showing the direction of tilt.

In this embodiment, operation input data, coordinate data, and sensor data are used as data showing an operation input by a user. Hereinafter, these data are generally referred to as "operation input data."

Figure 3:
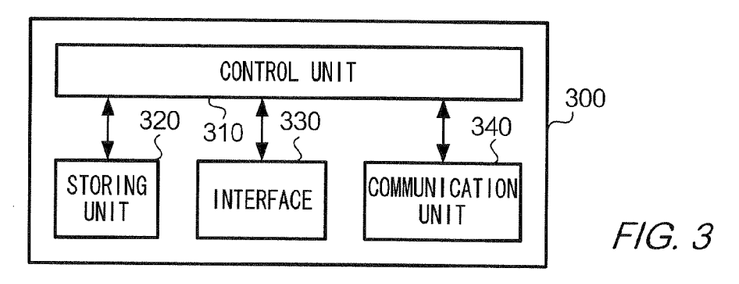
FIG. 3 shows an example of a hardware configuration of information-processing device 300.

FIG. 3 shows an example of a hardware configuration of information-processing device 300. Information-processing device 300 includes control unit 310, storing unit 320, interface 330, and communication unit 340.

Control unit 310 controls hardware components of information-processing device 300. Control unit 310 includes a processor such as a CPU and/or a GPU (Graphics Processing Unit), and a memory.

Storing unit 320 stores data, and includes a storage device such as a flash memory and/or a hard disk drive. It is to be noted that storing unit 320 may include a unit for reading/writing data from/to a detachable storage medium such as a memory card and an optical disk.

Interface 330 communicates data with display device 100 and terminal device 200. In this example, interface 330 communicates with terminal device 200 by wired communication, and with terminal device 200 by wireless communication. However, methods for communicating with display device 100 and terminal device 200 are not restricted to the examples.

Communication unit 340 communicates data with server device 500 via network 400.

Figure 4:
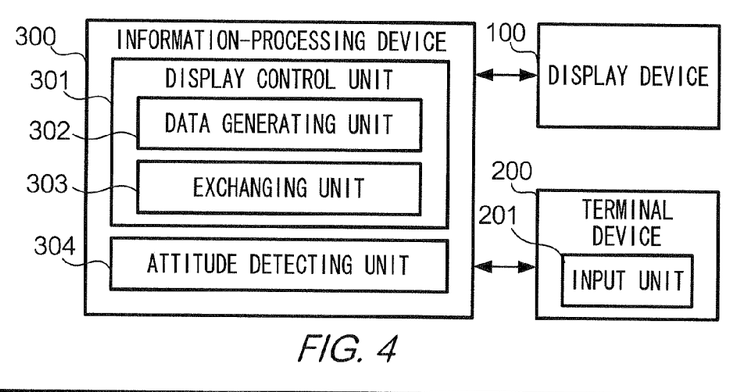
FIG. 4 shows an example of a functional configuration of display system 10.

FIG. 4 shows an example of a functional configuration of display system 10 (especially information-processing device 300). Information-processing device 300 functions as a display controlling device that includes display control unit 301, data generating unit 302, exchanging unit 303, and attitude detecting unit 304. These functions are implemented by a predetermined program executed by control unit 310. Terminal device 200 includes input unit 201. Input unit 201 receives an operation input by a user, and includes input unit 240, touch screen unit 260, and motion sensor unit 270.

Display control unit 301 controls display device 100 and terminal device 200 to display an image corresponding to map data. Here, an image corresponding to the map data refers to an image including a map image or a panoramic image. The map data includes, for example, data described by HTML (HyperText Markup Language) and image data having a predetermined file format such as JPEG (Joint Photographic Experts Group). However, the data structure of the map data is not restricted to this example. Display control unit 301 further includes data generating unit 302 and exchanging unit 303.

Data generating unit 302 generates display data based on the map data. Data generating unit 302 executes image processing such as rendering and rasterizing, so as to generate, from the map data, display data that comply with display device 100 and terminal device 200. It is to be noted that data generating unit 302 may compress the display data to decrease data size. In such a case, terminal device 200 expands the display data before displaying an image. The image data is compressed by, for example, H.264.

Exchanging unit 303 exchanges (or switches) an image displayed on display device 100 and an image displayed on terminal device 200. In other words, at a predetermined timing, exchanging unit 303 controls terminal device 200 to display an image that has been displayed on display device 100, and controls display device 100 to display an image that has been displayed on terminal device 200. Exchanging unit 303 exchanges the displayed images in response to an operation input by a user. However, another event may trigger the exchanging. For example, exchanging unit 303 may exchange the displayed images at a timing when a predetermined image is displayed.

Attitude detecting unit 304 detects attitude of terminal device 200. Attitude detecting unit 304 detects the attitude of terminal device 200 by using at least one item of sensor data. Attitude detecting unit 304 may detect the attitude based on a difference from previously detected sensor data.

Figure 5:
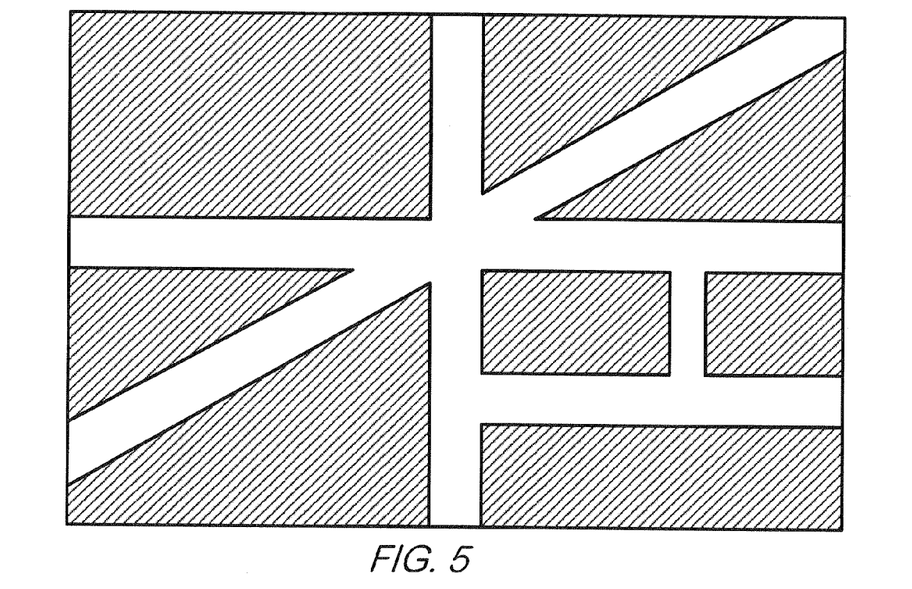
FIG. 5 shows an example of a map image.

FIG. 5 shows an example of a map image. The map includes a part denoting a road and a part denoting other features. In FIG. 5, the part denoting other features is shown by hatching for simplification. It is to be noted that the part denoting other features may be shown by a graphic representation of a building, for example. Positions on the map are identified by coordinates in a predetermined coordinate system; for example, latitude and longitude.

Figure 6:
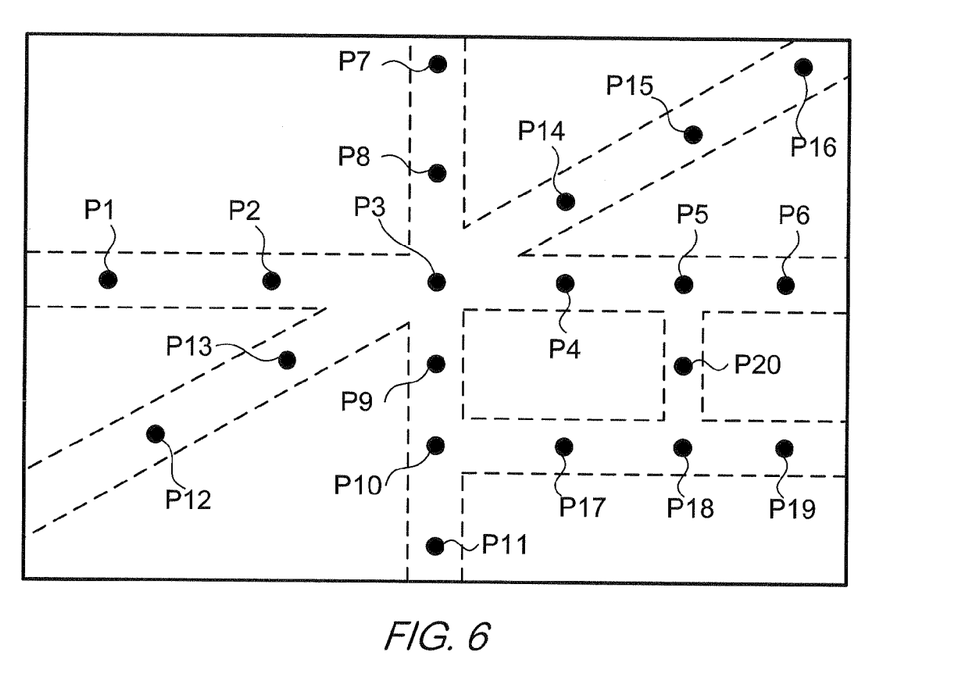
FIG. 6 shows an example of position data corresponding to a map image.

FIG. 6 shows an example of position data corresponding to a map image. Here, "position data" refers to a position of a panoramic image. The position data shows, for example, latitude and longitude. In the example shown in FIG. 6, position data shows that there are twenty panoramic images on roads at points P1 to P20. The distance between two points need not be constant. There may be more points (or panoramic images) than are shown in the example shown in FIG. 6.

A unique ID for identifying a position where a panoramic image exists may be allocated to each of the position data. Hereinafter, such an ID is referred to as a "panoramic ID." In this example, reference numerals P1 to P20 are used as the panoramic ID.

Figure 7:
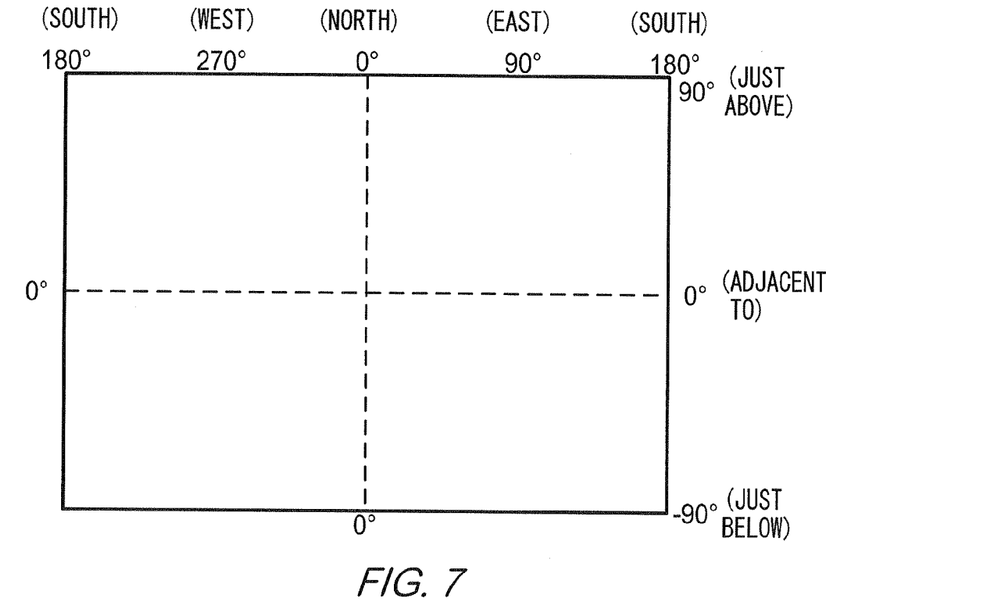
FIG. 7 shows an example of a structure of a panoramic image.

FIG. 7 shows an example of a structure of a panoramic image. In this example, the panoramic image is a rectangular image whose vertical scale corresponds to the pitch of +90° to −90° (just above to just under a horizontal direction) and whose horizontal scale corresponds to the yaw of 0° to 360° (north to north). The panoramic image is obtained by capturing images making an all-around view from a position shown by the position data. It is to be noted that, in this example, the angle corresponds to a line of sight of a user; for example, the image at the origin of the coordinate system of the panoramic image corresponding to a view seen by a user who stands at the point and faces true north.

It is to be noted that the entire panoramic image is not displayed on a single screen and only a part of the panoramic image is displayed on a single screen. A part of a panoramic image, which is clipped from the panoramic image in response to an operation input by a user, is displayed on terminal device 200. Further, the clipped part is changed in response to an operation input by a user to tilt terminal device 200. Hereinafter, a clipped part of a panoramic image is referred to as a "partial image."

The configuration of display system 10 is as described above. A user can browse a map image and a panoramic image by using display system 10. Further, when browsing the map image, a user can browse a panoramic image by identifying a position on the map image.

In this example, a user can browse both a map image and a panoramic image with two screens of display device 100 and terminal device 200. Further, a user can change the line of sight for a panoramic image by tilting terminal device 200.

Figure 8:
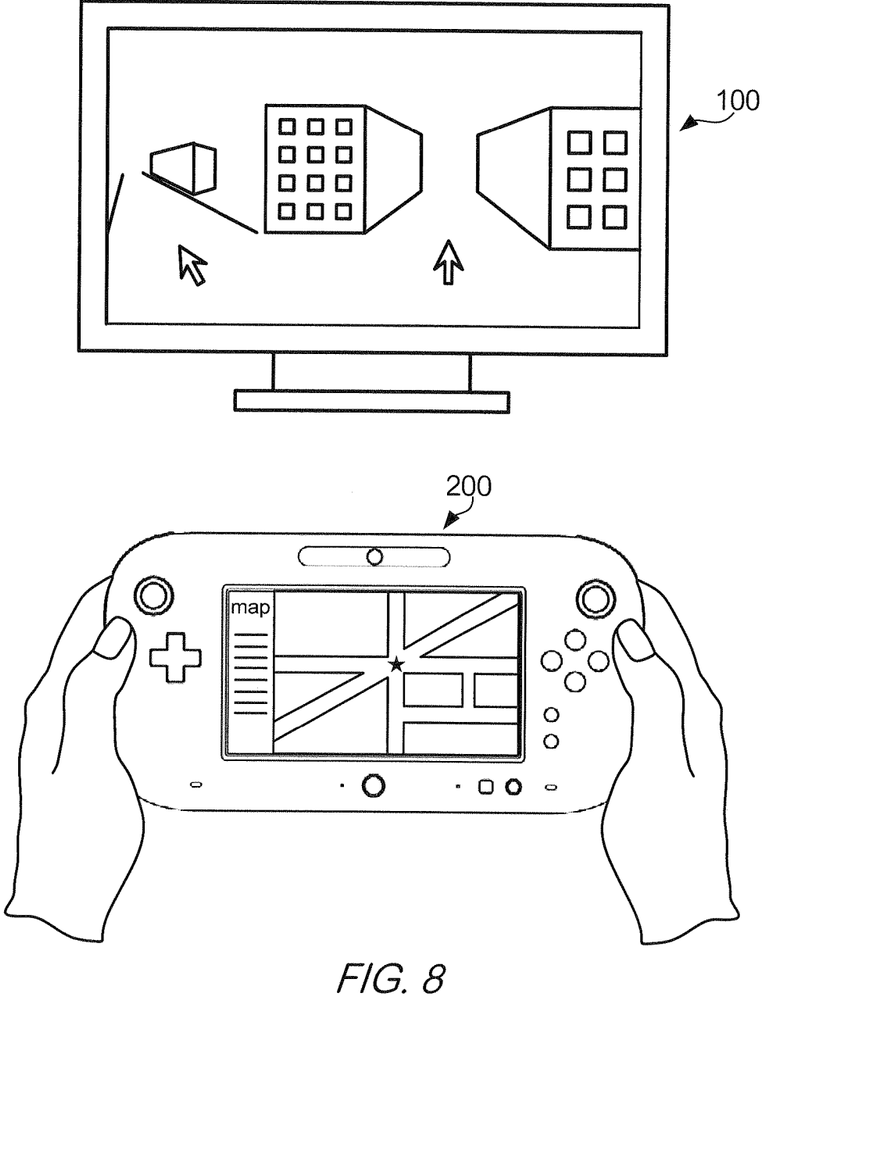
FIG. 8 shows an example of images displayed on display device 100 and terminal device 200.

FIG. 8 shows an example of displayed images on display device 100 and terminal device 200. In the example shown in FIG. 8, a panoramic image is displayed on display device 100 and a map image is displayed in terminal device 200. If a user identifies a position on a map by touching the screen using his/her finger or a stylus, a panoramic image of the position is displayed on display device 100.

For example, if a user traces a pathway on the screen using his/her finger or a stylus, display device 100 sequentially displays panoramic images in a direction along the pathway corresponding to a direction of forward movement. According to the embodiment, a user can experience an impression of walking along the pathway.

Figure 9:
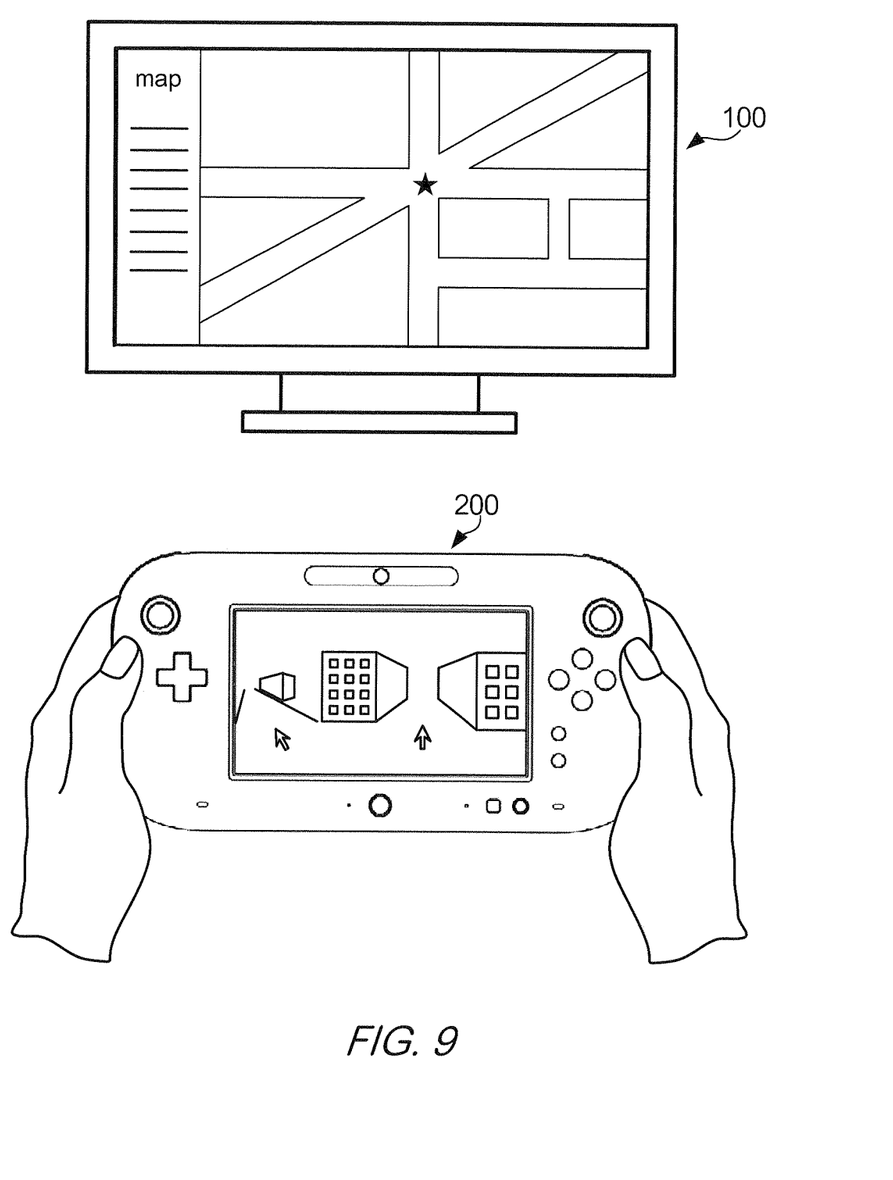
FIG. 9 shows another example of images displayed on display device 100 and terminal device 200.

FIG. 9 shows another example of displayed images on display device 100 and terminal device 200. In the example shown in FIG. 9, a map image is displayed on display device 100 and a panoramic image is displayed on terminal device 200. A user can switch the allocation of displayed image from FIG. 8 to FIG. 9 by an operation input such as pushing down a button. It is to be noted that terminal device 200 displays a panoramic image from a viewpoint indicated by a star mark in the figure, which corresponds to point P3, directing to west (left side of display device 100). In such a case, terminal device 200 may display an image showing a direction of the line of sight (for example, an arrow indicating west).

In an example of FIG. 9, information-processing device 300 receives an operation input by a user in a method different from the example of FIG. 8. More specifically, in the example of FIG. 9, terminal device 200 changes the position of the viewpoint in response to a change of the attitude of terminal device 200. If a user changes the attitude of terminal device 200, the direction of the line of sight is changed in response to the attitude of terminal device 200. For example, if a user lifts up terminal device 200 so as to move the upper part of terminal device 200 towards the user and moves the lower part of terminal device 200 away from the user, terminal device 200 displays a partial image corresponding to the line of sight directed higher than the previous line of sight. A user can browse an image of any direction by moving terminal device 200. It is to be noted that, in such a case, display device 100 does not change a displayed image and continues to display the same map image. A condition for changing a map image is different from that for the partial image.

Figure 10:
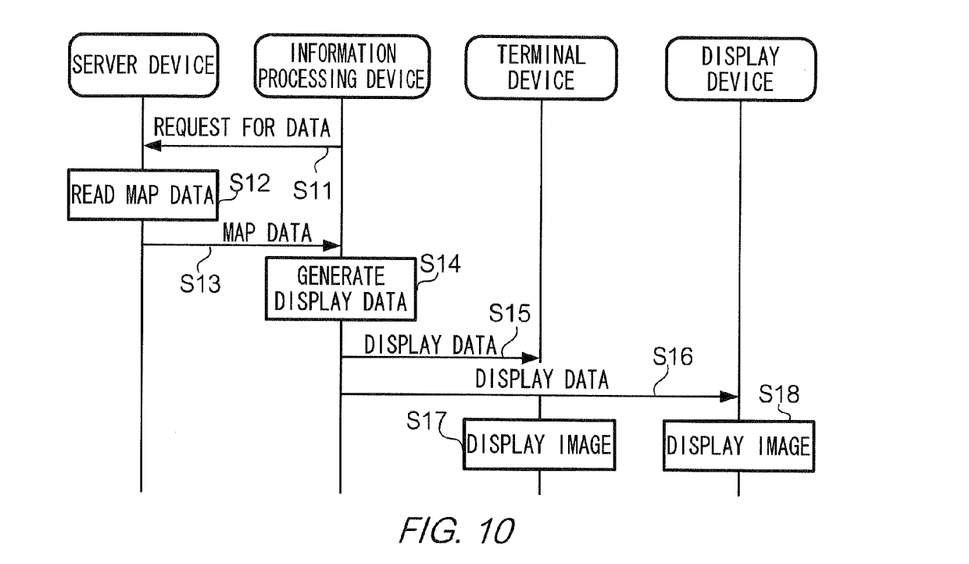
FIG. 10 shows an example of a sequence chart illustrating a process in display system 10.

FIG. 10 shows an example of a sequence chart illustrating a process in display system 10. For displaying a map image and a panoramic image, information-processing device 300 transmits (in step S11) a request for data to server device 500. Information-processing device 300 transmits the request based on an operation input by a user.

The request includes information used for displaying a map image and (a part of) a panoramic image. The request includes information showing a position on the map (for example, latitude and longitude, or a panoramic ID) and a direction of the line of sight (for example, yaw and pitch as shown in FIG. 7). It is to be noted that in a case that a user specifies a magnification of panoramic image, the request may include information showing the magnification.

When receiving the request from information-processing device 300, server device 500 reads (in step S12) map data in response to the received request. Server device 500 identifies a panoramic image to be processed in response to the request, and clips a partial image from the identified panoramic image in response to the direction of the line of sight. Then, server device 500 transmits (in step S13) to information-processing device 300 map data including at least a map image and a partial image.

There may be a case where no panoramic image exists at a position identified by a user. In such a case, server device 500 may identify the position nearest to the position identified by the user, and execute the above-described process using a panoramic image corresponding to the nearest position. Alternatively, server device 500 may notify information-processing device 300 of that no panoramic image is displayed. Further, a substitute image may be displayed instead of the panoramic image.

When receiving map data, information-processing device 300 generates (in step S14) display data based on the received map data. Information-processing device 300 executes a process for predetermined image processing and generates display data for display device 100 and display data for terminal device 200. Server device 500 transmits (in steps S15 and S16) the display data to display device 100 and terminal device 200. Display device 100 and terminal device 200 display (in steps S17 and S18) images according to the received image data. Display device 100 displays one of a map image and a partial image and terminal device 200 displays the other of the map image and the partial image.

Figure 11:
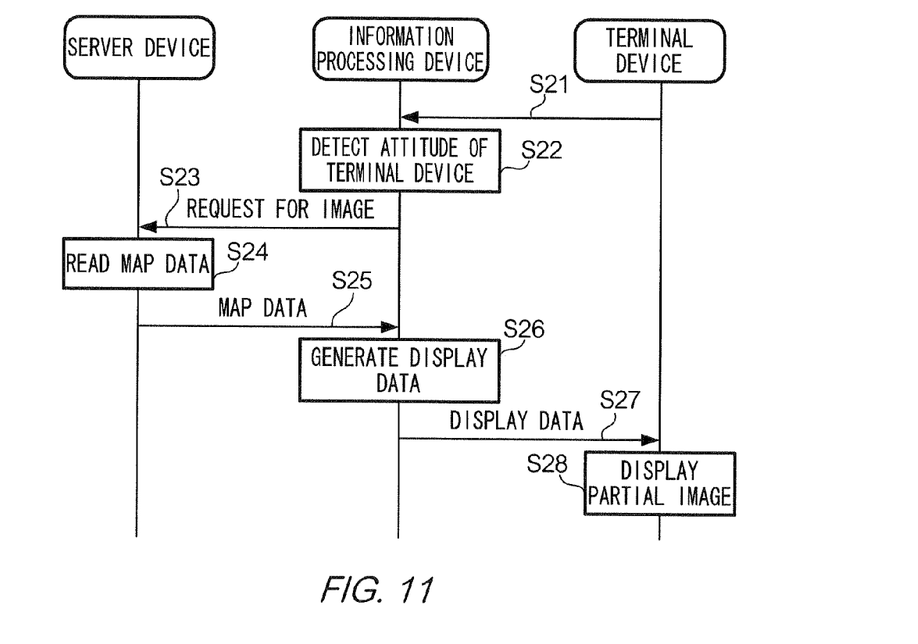
FIG. 11 shows an example of a sequence chart illustrating a process for changing a displayed image in response to an attitude of terminal device 200.

FIG. 11 shows an example of a sequence chart illustrating a process for changing a displayed image in response to an attitude of terminal device 200. Hereinafter, the process shown in FIG. 11 is referred to as a process for displaying a partial image. In this example, terminal device 200 displays a partial image. Terminal device 200 transmits (in step S21) to information-processing device 300 operation data showing the attitude of terminal device 200. When receiving the operation data, information-processing device 300 detects (or identifies) (in step S22) the attitude of terminal device 200 based on the operation data, and identifies the direction of the line of sight. Information-processing device 300 identifies a change of the line of sight by detecting a change of the attitude of terminal device 200.

Information-processing device 300 transmits (in step S23) to server device 500 a request for an image in response to the direction of the line of sight identified in step S22. It is to be noted that processes in steps S23 to S28 are identical to the processes in steps S11 to S15 and S17 shown in FIG. 10. The process shown in FIG. 11 is triggered by receipt of operation data showing a change of the attitude of terminal device 200. It is to be noted that information-processing device 300 may not change a displayed image on display device 100. Namely, information-processing device 300 may change direction (up-down or north, south, east, and west) of the image displayed on display device 100, in response to a change in yaw.

According to display system 10, display device 100 and terminal device 200 can display different information (a map image and a panoramic image) on display device 100 and terminal device 200, relating to an identified position on the map. For example, in display system 10, display device 100 displays a panoramic image and terminal device 200 displays a map image as shown in FIG. 8. Thus, if a number of people (for example, a family or a group of friends) browse a panoramic image, a specific user (who holds terminal device 200) can identify a pathway to display the panoramic images without the pathway being known to other users. Further, since a map image and a panoramic image are displayed on different screens, visibility of the images is improved compared with a case where a map image and a panoramic image are displayed on a single screen.

Further, information-processing device 300 and display device 100 can exchange displayed images with each other. Thus, a user can switch an image that the user wishes to see in detail to be displayed on terminal device 200. Further, by changing a method for receiving an operation input by a user between a time when terminal device 200 displays a map image and a time when terminal device 200 displays a panoramic image, terminal device 200 can provide different user experiences in response to an image displayed on terminal device 200.

Specifically, in a case that terminal device 200 displays a panoramic image, terminal device 200 can display a partial image in response to a change in the attitude of terminal device 200, by changing the attitude of terminal device 200 while terminal device 200 is displaying a panoramic image. Displaying system can provide user experiences in which a user is at the position on the map, and can see the landscape via the screen of terminal device 200.

2. Modification

The above exemplary embodiment is merely an example and the present disclosure is not restricted thereto. At least two of the following modifications may be combined.

Modification 1

Images displayed on display device 100 and terminal device 200 may be identical with each other. Display system 10 may operate in a first mode where display device 100 and terminal device 200 display the same image (a map image or a panoramic image), and a second mode where display device 100 and terminal device 200 display different images (one is a map image and the other is a panoramic image). Further, active mode may be switched by an operation input by a user. If the active mode is switched quickly in response to an operation input by a user, other users are not conscious of the operation input performed by the user.

Modification 2

Figure 12:
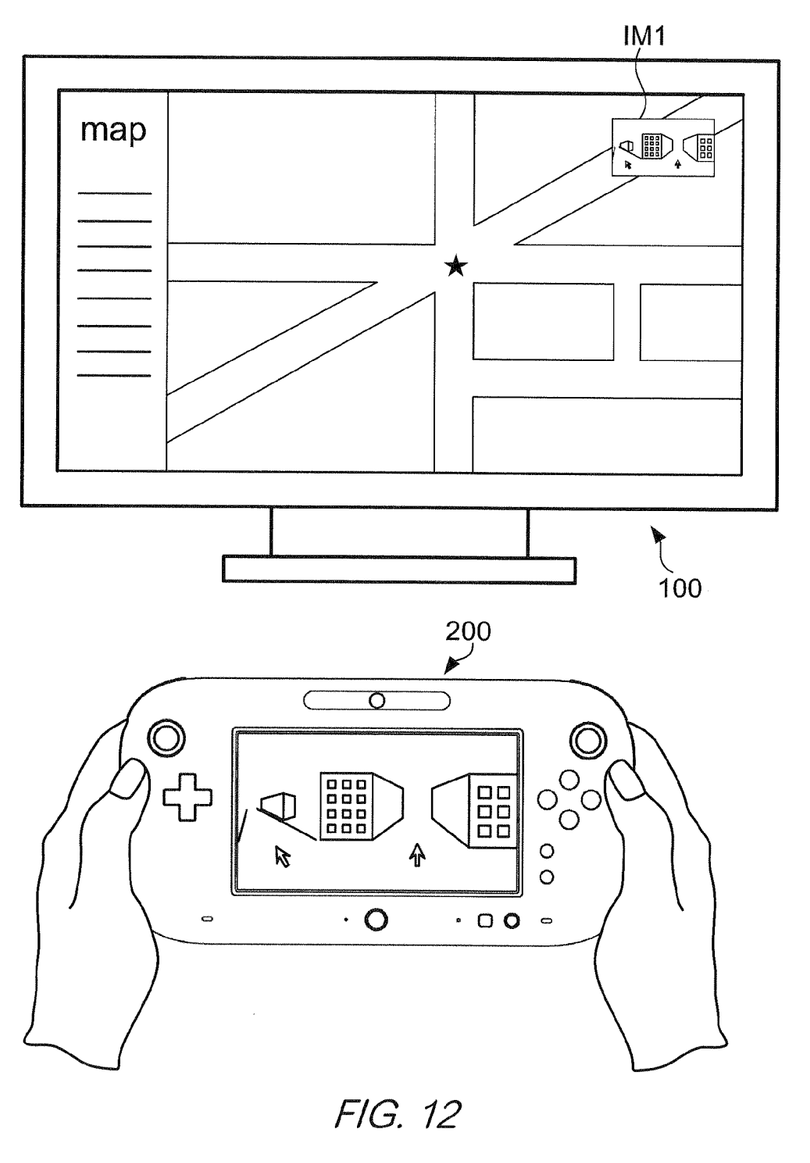
FIG. 12 shows an example of a displayed image according to modification 2.

Information-processing device 300 may control display device 100 to display an image displayed on terminal device 200. For example, if terminal device 200 displays a panoramic image (master), information-processing device 300 may control display device 100 to display the panoramic image (slave). In display device 100, the panoramic image and the map image may overlap. Alternatively, the panoramic image and the map image may be displayed in different areas.

Figure 13:
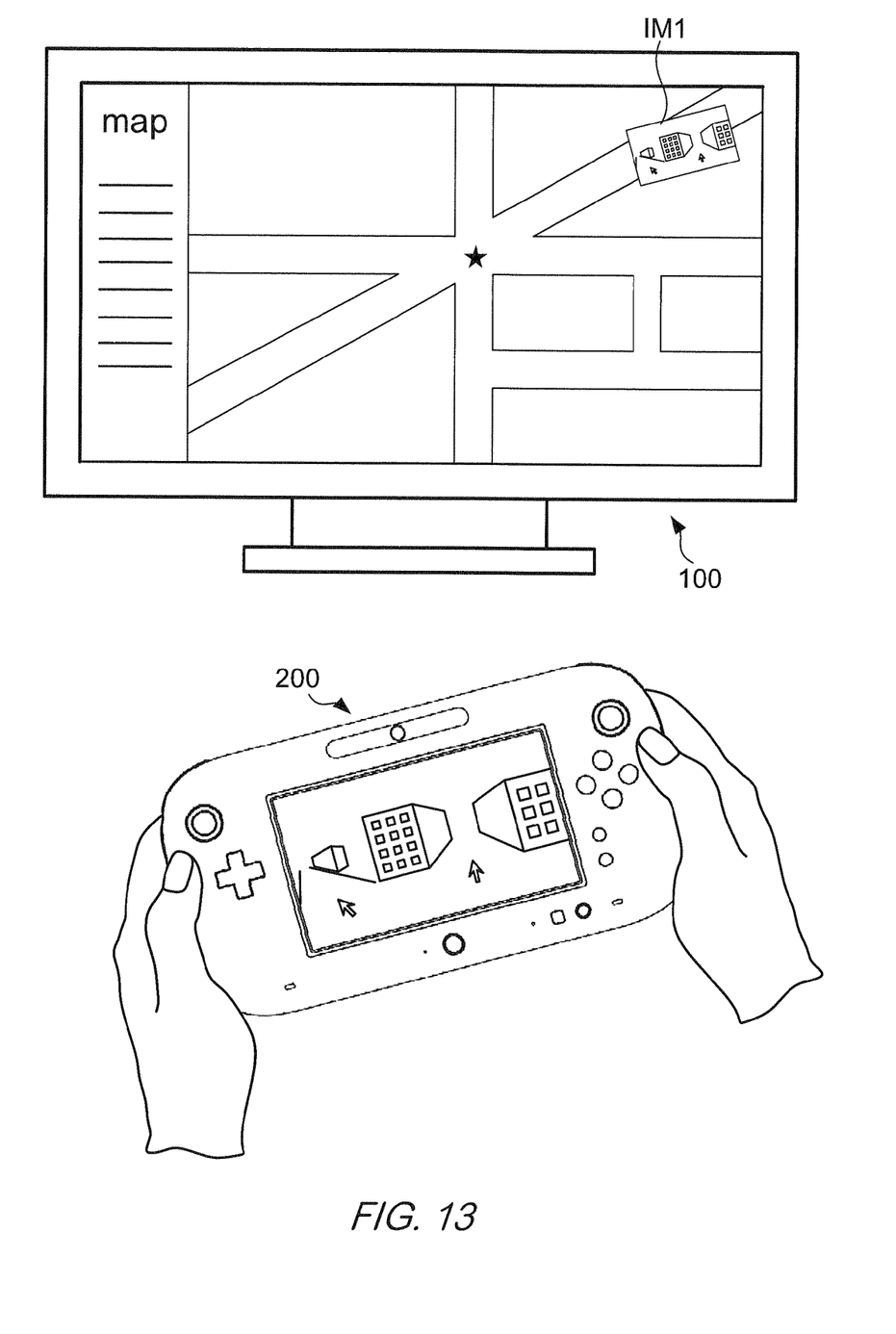
FIG. 13 shows another example of a displayed image according to modification 2.

FIG. 12 shows an example of a displayed image according to modification 2. Image IM1, which is displayed on display device 100, is a slave image corresponding to a master image, and is identical to a partial image displayed on terminal device 200. FIG. 13 shows another example of a displayed image according to modification 2. Image IM1 is tilted in response to an attitude of terminal device 200. To implement this function, information-processing device 300 detects roll of terminal device 200 in addition to pitch and yaw.

Further, terminal device 200 may display an image displayed on display device 100 as a slave image. In such a case, information-processing device 300 may switch the master image and the slave image in response to a screen touch input by a user. Further, operation mode described in modification 1 may be switched in response to a touch on the screen.

Modification 3

Information-processing device 300 may detect a direction of gravity in relation to terminal device 200 so as to control terminal device 200 to display a panoramic image that is rotated in response to the direction of gravity. It is to be noted that the direction of gravity may be detected by a triaxial acceleration sensor.

Figure 14:
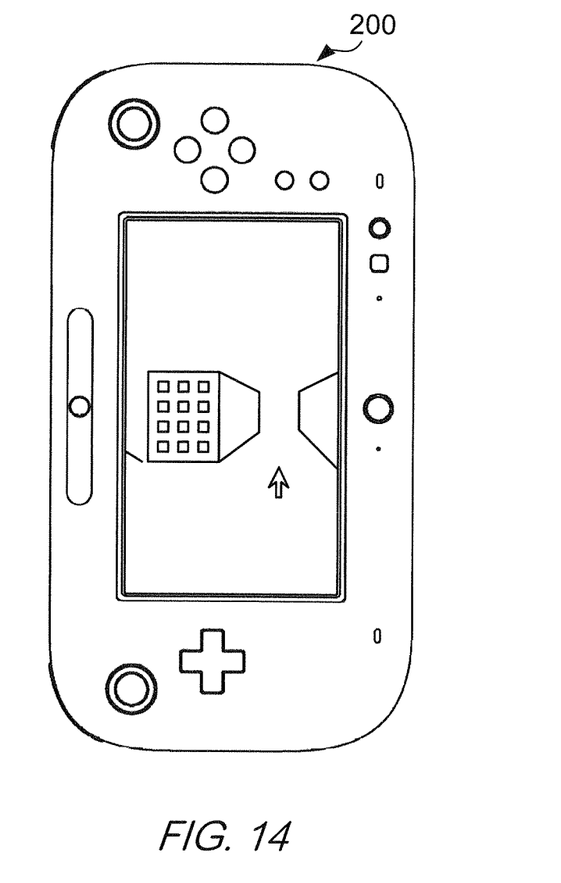
FIG. 14 shows an example of a displayed image according to modification 3.

FIG. 14 shows an example of a displayed image according to modification 3. Information-processing device 300 may clip a partial image whose frame is rotated in response to the detected direction of gravity, and control terminal device 200 to display the partial image. In other words, information-processing device 300 may rotate a displayed partial image (panoramic image) in response to the detected direction of gravity. It is to be noted that information-processing device 300 may rotate the partial image if a change in roll is greater than a threshold. According to the example, if a change in roll is less than the threshold (in other words, a change in angle before and after the tilt is less than a threshold), the direction of the partial image is maintained.

Modification 4

Instead of information-processing device 300, terminal device 200 may include attitude detecting unit 304. In such a case, terminal device 200 may transmit data showing the detected attitude (for example, pitch and yaw) to information-processing device 300 instead of the operation data.

Modification 5

A map shown by the map data is not restricted to a map on dry land. For example, the map may be of the seabed or undersea channels. Further, the map may show geography of an astronomical body other than the earth, for example, the moon.

Further, a map shown by the map data is not restricted to a map of a real space. For example, the map may show geography of a virtual space. In such a case, images generated by 3-dimensional computer graphics may be used as the panoramic images.

Modification 6

In display system 10, many processes are executed on information-processing device 300 and terminal device includes fewer functions, like a so-called thin client. However, a display control unit of the present disclosure may be implemented on terminal device 200. In such a case, information-processing device 300 may be omitted, and terminal device 200 includes functions to receive map data and to control display device 100, for example. Further, terminal device 200 may be a so-called tablet device, a portable game device, or a smart phone. Further, information-processing device may be a console-type game device or a personal computer.

Functions of information-processing device 300 shown in FIG. 4 may be implemented by hardware and/or software. If the functions are implemented by software, plural programs may be used to implement the functions, instead of a single program. These programs may be executed in different devices. Each of these programs may be provided by a storage medium such as an optical medium or a semiconductor memory. Alternatively, these programs may be downloaded via a network.

What is claimed is:

1. A display system comprising:
    a first display device;
    a second display device, wherein the second display device has a smaller display area than that of the first display device;
    a transceiver configured to communicate with an electronic storage device that stores a plurality of panoramic images;
    an attitude detecting unit configured to detect an attitude of the second display device; and
    a display control unit configured to:
        control the first display device to display an image of a planar map, where each one of the plurality of panoramic images stored on the electronic storage device is an image that shows a view from a corresponding location on the planar map and corresponds to views in various directions from the corresponding location,
        identify a given location on the planar map that is displayed on the first display device based on input received via at least one of the first display device and the second display device,
        control the second display device to display a partial image which is a part of a panoramic image corresponding to the given location identified from the input, the panoramic image being different from the image of the planar map, where the partial image is clipped from the panoramic image in response to the attitude detected by the attitude detecting unit,
        control the first display device to display, along with the image of the planar map, the partial image, and
        control the first display device to tilt the partial image that is displayed on the first display device in response to a change in the attitude detected by the attitude detecting unit,
    wherein orientation of the partial image displayed on the second display device is maintained for changes in the determined attitude of the second display device that are less than a threshold amount and adjusted for changes in the determined attitude of the second display device that are greater than the threshold amount.

2. The display system according to claim 1, wherein:
    the display control unit is further configured to change the displayed image for the planar map in response to a condition different from that for the partial image.

3. The display system according to claim 1, further comprising
    a switching unit configured to mutually switch images displayed on the first display device and the second display device.

4. The display system according to claim 3, further comprising an input unit configured to receive an operation input by a user, wherein
    the input unit is further configured to receive an operation input by a user in a different way between a case where the second display device displays the image for the planar map and another case where the second display device displays the partial image.

5. The display system according to claim 1, wherein
    the display control unit is further configured to control the first display device to display the image for the planar map and the partial image displayed on the second display device.

6. The display system according to claim 1, wherein the attitude detecting unit is further configured to detect a direction of gravity, and
    the display control unit is further configured to rotate the displayed partial image in response to the direction of gravity detected by the attitude detecting unit.

7. The display system according to claim 1, wherein the display control unit further includes a data generating unit that generates data for causing the first display device and the second display device to display an image.

8. A computing system for controlling a first display device and a second display device, the second display device having a smaller display area than the first display device, the computing system coupled to a sensor that is configured to acquire sensor data for determining an attitude of the second display device, the computing system comprising:
    at least one hardware processor configured to:
        communicate, via a transceiver of the computing system, with an electronic storage device that stores a plurality of panoramic images;
        control the first display device to display an image of a planar map, where each one of the plurality of panoramic images stored on the electronic storage device is an image that shows a view from a corresponding location on the planar map and corresponds to views in various directions from the corresponding location;
        identify a given location on the planar map based on input received via at least one of the first display device and the second display device,
        control the second display device to display a partial image which is a part of a panoramic images corresponding to the given location identified from the received input, where the partial image is clipped from the panoramic image in accordance with the determined attitude, where the panoramic image is different from the image of the planar map;
        control the first display device to concurrently display, along with the image of the planar map, the partial image; and control the first display device to tilt the partial image that is displayed on the first display device in response to the determined attitude, wherein the partial image displayed on the first display device is tilted in response to a change in determined attitude of the second display device, where orientation of the partial image displayed on the second display device is maintained for changes in determined attitude of the second display device that are less than a threshold amount and adjusted for changes in detected attitude of the second display device that are greater than the threshold amount.

9. A computer-readable non-transitory storage medium storing a program for use with a computer coupled to a first display device, a second display device, and a sensor configured to acquire sensor data for determining an attitude of the second display device, the computer including at least one hardware processor, the second display device having a smaller display area than the first display device, the program comprising instructions configured to cause the computer to:

communicate, via a transceiver of the computer, with an electronic storage device that stores a plurality of panoramic images;

control the first display device to display an image of a planar map, where each one of the plurality of panoramic images stored on the electronic storage device is an image that shows a view from a corresponding location on the planar map and corresponds to views in various directions from the corresponding location;

identify a given location on the planar map based on input received via at least one of the first display device and the second display device; control the second display device to display an image of a planar map, partial image which is a part of a panoramic image corresponding to the given location identified from the received input, where the partial image is clipped from the panoramic image based on with the determined attitude, where the panoramic image is different from the map image;

control the first display device to concurrently display, along with the image of the planar map, the partial image; and control the first display device to tilt the partial image that is displayed on the first display device in response to a change in the determined attitude, wherein orientation of the partial image displayed on the second display device is maintained for changes in the determined attitude of the second display device that are less than a threshold amount and adjusted for changes in the determined attitude of the second display device that are greater than the threshold amount.

10. A method comprising:

communicating, via a transceiver coupled to a processing system, with an electronic storage device that stores a plurality of panoramic images;

controlling, by using the processing system that includes at least one hardware processor, a first display device to display an image of a planar map, where each one of the plurality of panoramic images stored on the electronic storage device is an image that shows a view from a corresponding location on the planar map and corresponds to views in various directions from the corresponding location;

identifying a given location on the planar map based on input received via at least one of the first display device and the second display device;

determining an orientation of the second display device based on sensor data acquired via a sensor that is coupled to the processing system, the panoramic image being different from the image of the planar map;

controlling, by using the processing system, a second display device to display a partial image which is a part of a panoramic image corresponding to the given location identified from the received input, where the partial image is clipped from the panoramic image based on with the determined orientation and the second display device has a smaller display area than the first display device;

controlling the first display device to display, along with the image of the planar map, the partial image; and controlling the first display device to tilt the partial image that is displayed on the first display device in response to the determined orientation wherein the partial image displayed on the first display device is tilted in response to a change in determined attitude of the second display device, where orientation of the partial image displayed on the second display device is maintained for changes in determined attitude of the second display device that are less than a threshold amount and adjusted for changes in detected attitude of the second display device that are greater than the threshold amount.

11. The display system of claim 1, wherein:
the second display device is integrated into a portable device, and
the second display device is smaller than the first display device.

12. The display system of claim 11, wherein the portable device includes a sensor that is used for determining the attitude of the portable device.

13. The computing system of claim 10, wherein:
the second display device is integrated into a portable device, and
the second display device is smaller than the first display device.

14. The computer-readable non-transitory storage medium of claim 11, wherein:
the second display device is integrated into a portable device, and
the second display device is smaller than the first display device.

15. The method of claim 12, wherein:
the second display device is included as part of a portable device, and
the second display device is smaller than the first display device.

16. The computing system of claim 10, wherein the second display device is part of a mobile electronic device, wherein the at least one hardware processor is further configured to:

concurrently cause 1) the second display device to display the image of the planar map, and 2) the first display device to display the partial image of the panoramic image;

while the image of the planar map and partial image are concurrently displayed, update which portion of the panoramic image is the displayed partial image based on first input(s) provided to the mobile electronic device and/or the determined attitude of the second display device; and while the image of the planar map and partial image are concurrently displayed and responsive to at least one second input provided to mobile electronic device, cause the concurrently displayed image of the planar map and partial image to switch between the first and second display devices.

17. The computing system of claim 10, wherein the input is a touch input that identifies a pathway along the planar map, wherein multiple different locations are identified via the touch input,
   wherein different panoramic images are used to sequentially display different partial images on the first display device in accordance with a direction along the pathway corresponding to a direction of forward movement.

18. The computing system of claim 10, wherein the input to identify the given location on the planar map that is displayed on the first display device is received via the second display device.

* * * * *